United States Patent [19]

Matsumoto et al.

[11] Patent Number: 5,329,912
[45] Date of Patent: Jul. 19, 1994

[54] INDUCTION SYSTEM FOR AN INTERNAL COMBUSTION ENGINE

[75] Inventors: Hiromitsu Matsumoto; Chizuko Imai, both of Iwata, Japan

[73] Assignee: Yamaha Hatsudoki Kabushiki Kaisha, Iwata, Japan

[21] Appl. No.: 994,191

[22] Filed: Dec. 21, 1992

[30] Foreign Application Priority Data

Dec. 19, 1991 [JP] Japan .................. 3-336664
Jan. 20, 1992 [JP] Japan .................. 4-7474
Feb. 7, 1992 [JP] Japan .................. 4-22462

[51] Int. Cl.$^5$ .................................. F02B 31/02
[52] U.S. Cl. .......................... 123/568; 123/432
[58] Field of Search ........... 123/568, 569, 570, 571, 123/432, 90.16

[56] References Cited

U.S. PATENT DOCUMENTS

| | | | |
|---|---|---|---|
| 4,462,351 | 7/1984 | Fujii et al. | 123/571 |
| 4,492,209 | 1/1985 | Otani et al. | 123/568 |
| 4,617,896 | 10/1986 | Yoshikawa | 123/432 |
| 4,856,473 | 8/1989 | Kawai et al. | 123/570 |
| 4,924,840 | 5/1990 | Wade | 123/571 |
| 5,060,616 | 10/1991 | Nakagawa et al. | 123/432 |
| 5,119,784 | 6/1992 | Hashimoto et al. | 123/432 |
| 5,119,785 | 6/1992 | Saito et al. | 123/432 |
| 5,203,311 | 4/1993 | Hitomi et al. | 123/571 |

Primary Examiner—Tony M. Argenbright
Assistant Examiner—M. Macy
Attorney, Agent, or Firm—Knobbe, Martens, Olson & Bear

[57] ABSTRACT

A number of embodiments of inductions and fuel injection systems for internal combustion engines that improve exhaust emission control and fuel economy without adversely effecting the running of the engine under any running condition. This is accomplished by injecting fuel into one of at least two intake passages and providing exhaust gas recirculation into another of the intake passages. A stoichiometric fuel air mixture is introduced and the amount of exhaust gas recirculation is such that a minimum amount of air is inducted into the combustion chamber through the other intake passage when exhaust gas recirculation is being accomplished. Both two and three intake valve systems are disclosed and these use either control valves for controlling the flow through the other intake passages or operate without control valve. In addition an arrangement is provided wherein the spray from a single fuel injector may be deflected into several of the intake passages under certain running conditions so as to provide a more uniform fuel introduction without necessitating multiple fuel injectors.

43 Claims, 8 Drawing Sheets

INDUCTION SYSTEM FOR AN INTERNAL COMBUSTION ENGINE

BACKGROUND OF THE INVENTION

This invention relates to an induction system for an internal combustion engine and more particularly to an improved induction system that permits better exhaust emission control while, at the same time, affording good fuel economy. In addition, the invention relates to an improved injection system for a multiple intake passage system for an engine.

It is well known that a variety of arrangements have been incorporated for improving exhaust gas emission control and particularly for controlling the emission of hydrocarbons, carbon monoxide and NOx in the exhaust gases of an engine. Unfortunately, many of the aspects employed to provide exhaust emission control can deteriorate the fuel economy of an engine.

In addition to exhaust emission control and fuel economy, it is also desirable to provide good running characteristics for the engine through its entire speed and load range. One way in which these varying conditions can be met is through the use of a compound induction system for the engine wherein low and mid-range performance is supplied by a single, relatively small intake passage to offer good turbulence in the combustion chamber while high speed requirements are provided by a larger effective passage so as to improve volumetric efficiency. Normally this type of compound induction system incorporates at least two intake passages that serve each combustion chamber with a throttle valve arrangement for controlling the flow through one of the intake passages so that it will supply no charge under low and mid-range load conditions. However, the existence of this additional passage and its flow control valve can give rise to pumping losses that deteriorate the fuel economy of the engine when the control valve is closed.

It is, therefore, a principal object of this invention to provide an improved induction system for an engine wherein good performance results under all running conditions and at the same time effective exhaust emission control is achieved.

It is a further object of this invention to provide an improved induction system for an engine that permits the aforenoted results while, at the same time, eliminating or substantially reducing pumping losses under low and mid-range performance so as to improve fuel economy.

One way in which NOx emissions are controlled is through the use of exhaust gas recirculation (EGR). Recirculating exhaust gases into the combustion chamber under at lease some running conditions reduces the temperature in the combustion chamber and the formation of NOx. However, the use of EGR can give rise to poor running characteristics when large quantities of exhaust gases are recirculated. In addition, many engines are very sensitive to the amount of the EGR.

It is, therefore, a still further object of this invention to provide an improved system for permitting increased usage of EGR without deteriorating engine performance.

It is a further object of this invention to provide an EGR system for an engine having a compound induction system wherein the EGR is employed to reduce pumping losses as well as controlling the emission of NOx.

With compound induction systems, it is frequently the practice to inject fuel in such a manner that a single fuel injector can supply fuel to all induction passages serving a given combustion chamber. However, when there is no flow occurring through certain of the induction passages under some running conditions, any fuel injected into this passage will be lost or can cause other disadvantageous results. Therefore, it is frequently proposed to employ multiple fuel injectors in such systems, which expedient adds to the cost and complexity of the system.

It is, therefore, a still further object of this invention to provide an improved fuel injection system for a compound induction system wherein only a single fuel injector is employed and means are provided for selectively controlling the spray pattern of the fuel injector.

SUMMARY OF THE INVENTION

A first feature of this invention is adapted to be embodied in an induction system for an internal combustion engine having a combustion chamber and at least a pair of intake passages serving the combustion chamber for introducing an intake charge thereto. At least one exhaust passage is provided for discharging exhaust gases from the combustion chamber. Means are provided for introducing a stoichiometric fuel air charge into at least one of the intake passages under at least one running condition. Means deliver exhaust gases from the exhaust passage into another of the intake passages at the one running condition.

Another feature of the invention is adapted to be embodied in an induction and fuel injection system for an internal combustion engine having a combustion chamber with at least a pair of intake passages serving the combustion chamber and having a common portion. A fuel injector sprays fuel into the common portion. Means are provided in the intake passage for movement between a first position wherein the spray from the fuel injector is directed toward one of the intake passages and another position wherein the fuel spray is directed toward additional intake passages.

DETAILED DESCRIPTION OF THE PREFERRED EMBODIMENTS

Figure 1:
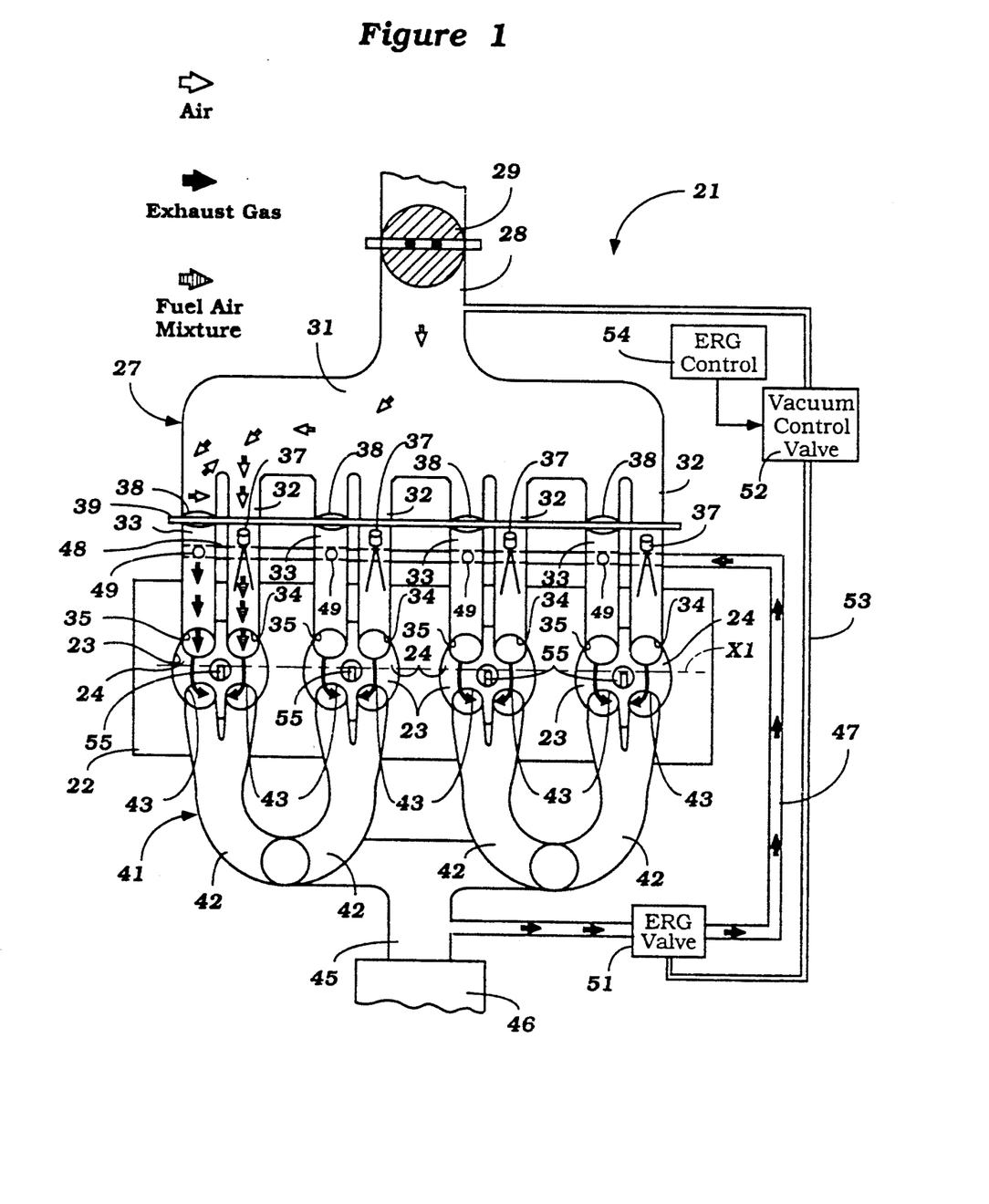
FIG. 1 is a partially schematic cross sectional view of an internal combustion engine constructed in accordance with a first embodiment of the invention.
Figure 2:
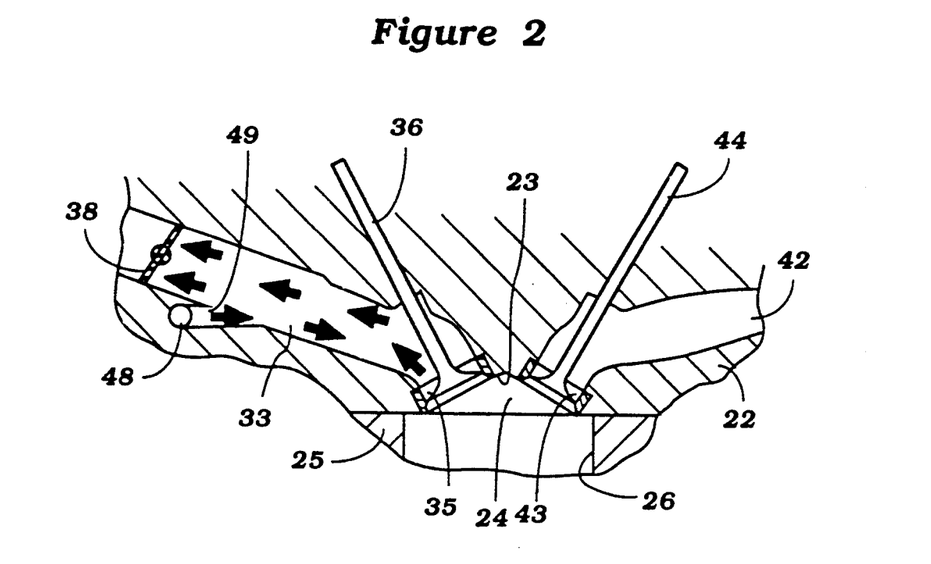
FIG. 2 is an enlarged cross sectional view taken through one of the intake passages under one running condition and before the intake valve opens.
Figure 3:
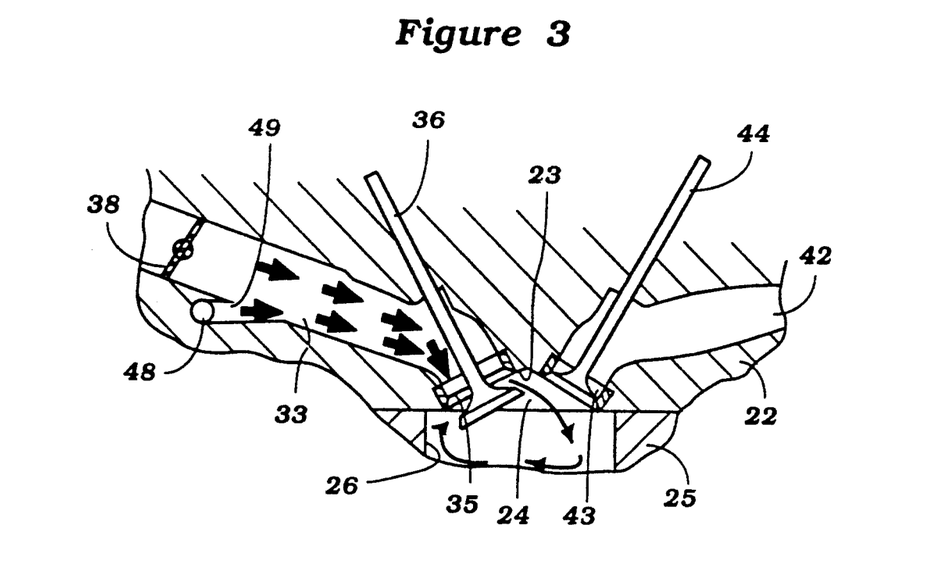
FIG. 3 is a cross sectional view, in part similar to FIG. 2, and shows the condition when the intake valve associated with this intake passage is opened.

Referring first to the embodiment of FIGS. 1 through 3, an internal combustion engine constructed in accordance with this embodiment is shown partially schematically and partially in cross section and is identified generally by the reference numeral 21. The engine 21 is, in the illustrated embodiment, of the four cylinder in-line type. It should be readily apparent to those skilled in the art, however, how the invention can be applied to multiple cylinder engines and engines having other cylinder configurations. Also, since the invention relates primarily to the induction system for the engine only that portion of the engine and related components have been shown in detail and the basic operating components of the engine, except insofar as will be described, may be considered to be conventional.

FIG. 1 shows generally the underside of a cylinder head 22 which is formed with individual combustion chamber recesses 23 which cooperate with the cylinder bores of the engine and pistons to form the combustion chambers. These combustion chambers appear in FIGS. 2 and 3 and are identified generally by the reference numeral 24 wherein the cylinder block is shown partially and is identified by the reference numeral 25 with its cylinder bores being designated at 26.

An induction system is supplied for the engine which is comprised on an intake manifold, indicated generally by the reference numeral 27 and which has an atmospheric air inlet portion 28 that receives atmospheric air through an air cleaner (ten shown) and in which a flow controlling throttle valve 29 is positioned. The throttle valve 29 is controlled by the operator in a suitable manner.

The intake passage 28 serves a plenum chamber 31 of the manifold 27. The manifold 27 has associated with each combustion chamber 24 a primary intake runner 32 and a secondary intake runner 33. The runners 32 and 33 cooperate with corresponding primary and secondary intake passages formed in the cylinder head 22 and which terminate at respective primary and secondary valve seats 34 and 35. Poppet type intake valves, shown at 36 in FIGS. 2 and 3, cooperate with the valve seats 34 and 35 so as to control the flow of the intake charge into the combustion chambers 24. In this embodiment, the intake valves 36 associated with the valve seats 34 and 35 open with the same timing. As will become apparent through the description of certain other embodiments, it is possible to employ different timing for the intake valves associated with the primary and secondary valve seats 34 and 35, respectively.

Fuel injectors 37 are mounted in the cylinder head or intake manifold 27 in a location so as to spray their fuel charge solely into the primary intake runners 32. The fuel injectors 37 are supplied with fuel from a suitable source and are designed so as to spray a stoichiometric fuel air mixture into the runners 32 under all running conditions.

Control valves 38 are supported in the secondary runners 33 and are all affixed to a common control valve shaft 39 so as to be operated in a desired sequence. Basically, the control valves 38 are maintained in a closed condition at idle and low load and open at mid and high range conditions. This sequenced operation can be achieved through a linkage system interconnecting the control valve shaft 39 with the throttle valve 29. Alternatively, the control valve shaft 39 may be operated by a servo motor or the like.

On the side of the cylinder head 22 opposite to the intake side thus far described, there is an exhaust system comprised of an exhaust manifold, indicated generally by the reference numeral 41 that has a plurality of siamesed exhaust passages 42 each of which communicates with a respective one of the combustion chambers 24. Valve seats 43 are formed in the cylinder head at the combustion chamber recess 23 and communicate with corresponding exhaust passages formed in the cylinder head that cooperate with the intake manifold passages 42. Exhaust valves 44 (FIGS. 2 and 3) control the flow through the exhaust runners 42 in a well known manner. The exhaust manifold 41 communicates with an exhaust pipe 45 in which a three way catalyzer 46 is provided. The catalyzer 46 is designed primarily to treat and reduce hydrocarbons and carbon monoxide in the exhaust gases.

The engine 21 is also provided with an EGR system which includes an EGR passage 47 that extends from the exhaust pipe 45 to an EGR manifold formed integrally in the cylinder head 22 and which is indicated by the numeral 48 in the figures. The manifold 48 terminates at individual EGR ports 49 that extend only into the secondary intake passages 33 and at a position immediately downstream of the control valves 38.

An EGR valve 51 is provided in the passage 47 and controls the flow of exhaust gases from the exhaust pipe 45 into the EGR manifold 48 of the cylinder head. The EGR valve 51 is operated under vacuum control by a vacuum control valve 52 than is positioned in a vacuum port 53 that communicates with the intake manifold intake portion 28. An EGR control 54 will switch the vacuum control valve 52 on or off to effect EGR in response to sensed engine conditions. The EGR control 54 can receive a number of engine and ambient condition signals such as engine speed, coolant temperature, throttle valve opening and other conditions as are well known for providing EGR operation. Normally, the EGR valve 51 will be closed at idle and at high load conditions and will be opened at other conditions.

Spark plugs 55 are positioned in the cylinder head 22 and have their gaps extending into the combustion chambers 24. In this embodiment, the spark plugs 55 have their gaps located on a central plane 61 and are disposed generally centrally in the combustion chambers 24. If desired, the spark plugs 55 may be offset slightly toward the primary intake passages 32 so as to insure good ignition and combustion when running under low and mid-range performance since substantially all of the fuel charge is delivered under this running condition in the proximity to the intake valve seats 34, as will be apparent from the description of the operation which now follows.

Assuming that the engine is running at low speed and in off/idle condition, the control valves 38 will be closed and the fuel injectors 37 will inject a stoichiometric fuel air mixture into the primary intake passages 32 which passes into the combustion chamber through the valve seats 34 when the intake valves 36 are opened.

Under this condition, there will also be EGR operation and as seen in FIG. 2 the exhaust gases will enter the secondary intake passage 33 downstream of the control valves 38, which are closed under this running condition. As a result, the portion of the secondary intake passage 33 between the control valve 38 and the valve seat 35 will be charged with exhaust gases. Generally, the amount of exhaust gas recirculation is approximately ten to twenty percent of the total air introduced to the combustion chambers so as to provide a relatively high amount of exhaust gas recirculation which will insure good NOx control.

When the intake valve 36 associated with the valve seal 35 opens (FIG. 3), these exhaust gases will then flow into the combustion chamber 24. Because of this, two distinct advantages are gained. First, in a conventional system without introduction of EGR into the secondary intake passages 34 there are large pumping losses under this condition since an air charge will be drawn from the passages 33 when the intake valves 36 open and this actually draws a partial vacuum in the passages 33. In addition, the flow of the exhaust gases into the combustion chamber along with the stoichiometric charge through the passages 32 can be employed generate turbulence in the combustion chamber 24 which will cause good mixing and rapid combustion once the spark plugs 55 are fired.

Preferably, the intake passages are formed so as to generate a tumble action under this condition. The tumble action is indicated by the small arrows in FIG. 3 which show that the charge flowing from the induction passages 33 floes across the cylinder bore 26 in addition to axially downwardly into it so as to create the tumble action which, in effect, constitutes a swirl about a horizontally disposed axis. Since this charge flows across the cylinder bore axis toward the opposite side of the cylinder, the charge will be redirected when it impacts the cylinder bore so as to flow back across the cylinder bore axis in the opposite direction. This causes the charge from each intake passage 33 to mix with the others. This action is also shown by the light arrows in FIG. 1. Hence, a stoichiometric mixture will still be present in the combustion chamber and this mixture will be substantially homogeneous due to this turbulence so as to insure complete burning of the mixture.

As the engine speed and load increases, the control valves 38 will be opened and the amount of exhaust gases introduced per intake charge may reduce slightly during such time as EGR is still employed. However, there will still be the generated turbulence in the combustion chamber and good mixing. As has been noted above, under high speed high load condition EGR will be discontinued. Thus, good performance and emission control is achieved under all running conditions and large amounts of EGR can be employed without creating poor running.

Figure 4:
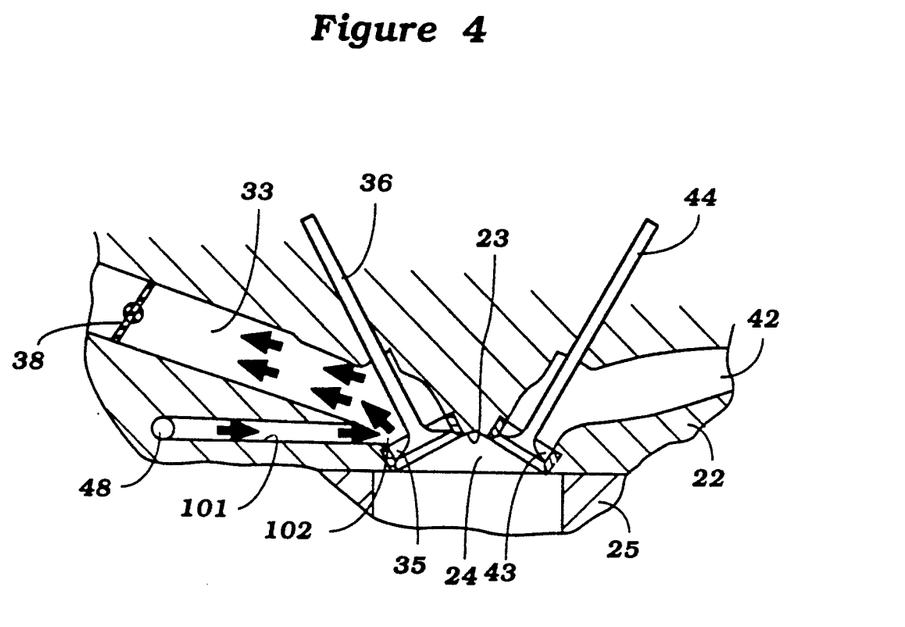
FIG. 4 is a cross sectional view, in part similar to FIG. 2, and shows another embodiment of the invention.

FIG. 4 shows another embodiment of the invention which is generally the same as the embodiment of FIGS. 1 through 3. Since the only difference is the location where the exhaust gases are introduced into the secondary intake passages 33 only a figure corresponding to FIGS. 2 and 3 is necessary to permit those skilled in the art to understand the invention. In this figure, components which are the same as those previously described have been identified by the same reference numerals and will not be described again, except insofar as is necessary to understand the construction and operation of this embodiment.

In this embodiment, the cylinder head EGR manifold 48 is intersected by a elongated passage 101 that terminates at an EGR port 102 that is immediately adjacent the valve seat 35. As a result, when the intake valves 36 are closed, the exhaust gases that are recirculated will collect first around the valve seat 35 and then back up into the secondary intake passage 33 toward the control valve 38 This location will insure that all of the exhaust gases are introduced into the combustion chamber 24 each time the intake valve 36 associated with the valve seat 35 is opened. As a result of this, it is possible to insure that there will be no residual exhaust gases in the secondary intake passages 33 and all of the advantages of the previously described embodiment will be enjoyed.

Figure 5:
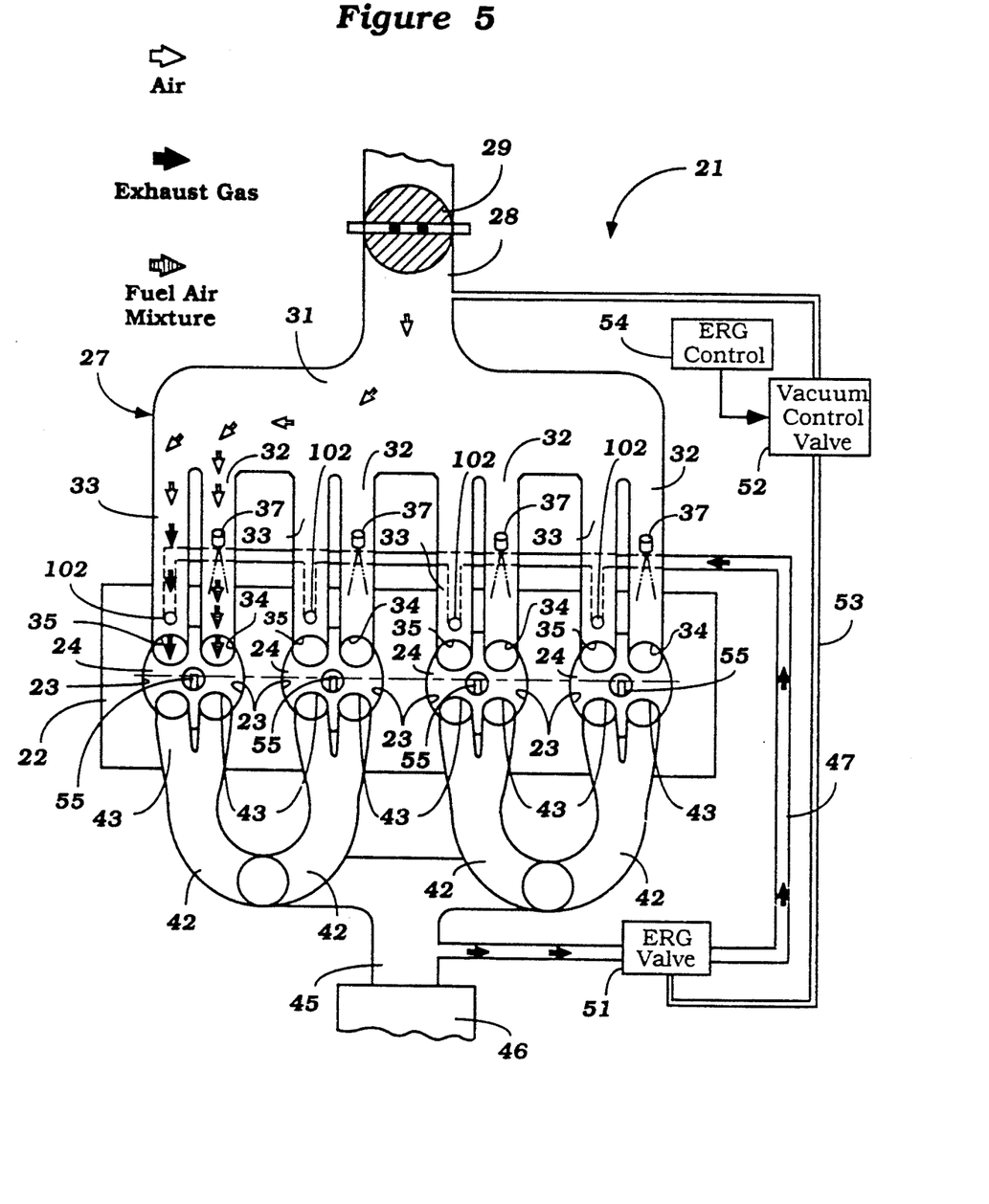
FIG. 5 is a partially schematic cross sectional view, in part similar to FIG. 1, and shows another embodiment of the invention.
Figure 6:
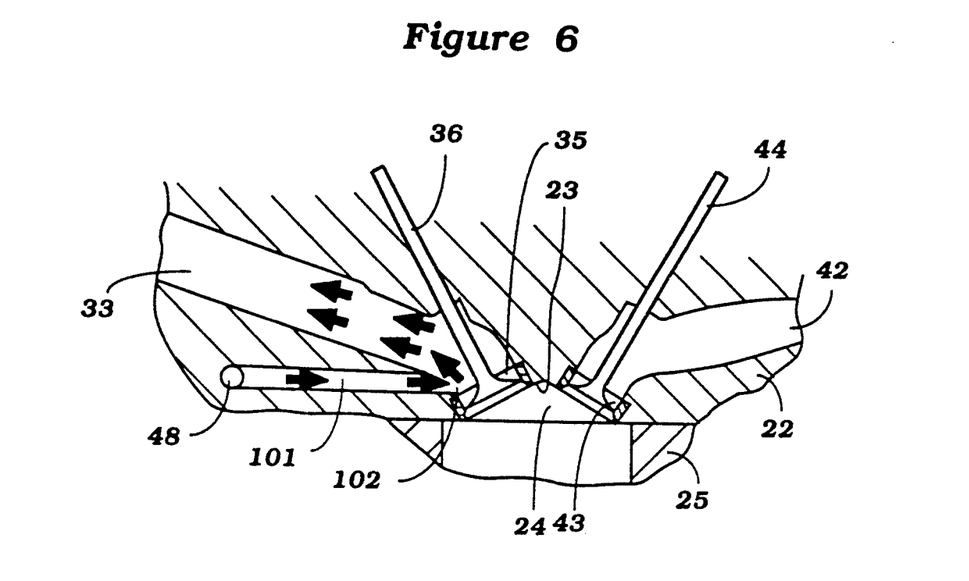
FIG. 6 is an enlarged cross sectional view, in part similar to FIG. 2, and shows the condition of this embodiment at the time before the intake valve is opened.
Figure 7:
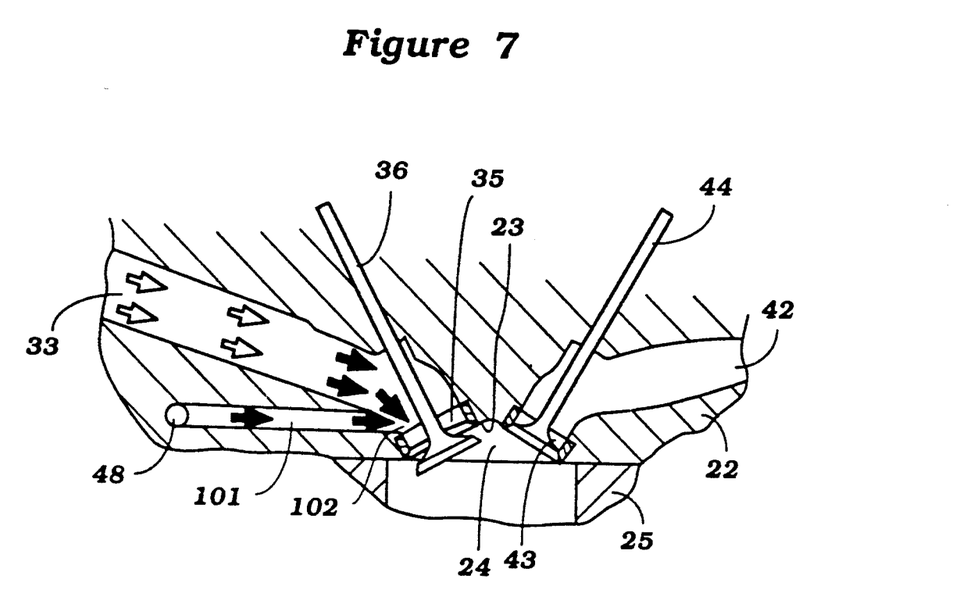
FIG. 7 is a cross sectional view, in part similar to FIG. 3, and shows the condition when the intake valve associated with the respective intake passage is opened.

FIGS. 5 through 7 show another embodiment which is generally the same as the embodiment of FIG. 4. This embodiment, however, has two basic differences between the previously described embodiments. However, in view of the other similarities, components of this embodiment which are the same have been identified by the same reference numerals and will not be described again, except insofar as is necessary to understand how this embodiment operates.

The two differences between this embodiment and that previously described in that this embodiment eliminates the control valves 38 and the control valve shaft 39. By employing the form of EGR introduction as shown in FIG. 4, it will be insured that during the phases when EGR is being employed there is no necessity for a closed control valve in the secondary intake passages 33. In addition and to further enjoy the advantages of this embodiment, the valve timing for operating the intake valves associated with the primary valve seats 34 and secondary valve seats 35 are different and that construction may be best understood by reference to FIGS. 8 and 9 which are the respective timing diagrams.

FIGS. 6 and 7 show how the secondary induction passages 33 will be filled with exhaust gases during the time when EGR recirculation is taking place and how this will avoid undue dilution of the fuel air charge supplied through the primary induction passages 32 at this time. Referring first to FIG. 6, when the intake valves 36 are closed the exhaust gases will flow from the cylinder head EGR manifold 48 through the exhaust discharge ports 102 in proximity to the intake valve seats 35. The exhaust gases will then back up in the induction passages 33 toward the plenum chamber 31 of the intake manifold 27. When the intake valves 36 open, the exhaust gases will then flow into the combustion chamber 24 and very little, if any, fresh air charge will also be inducted.

Figure 8:
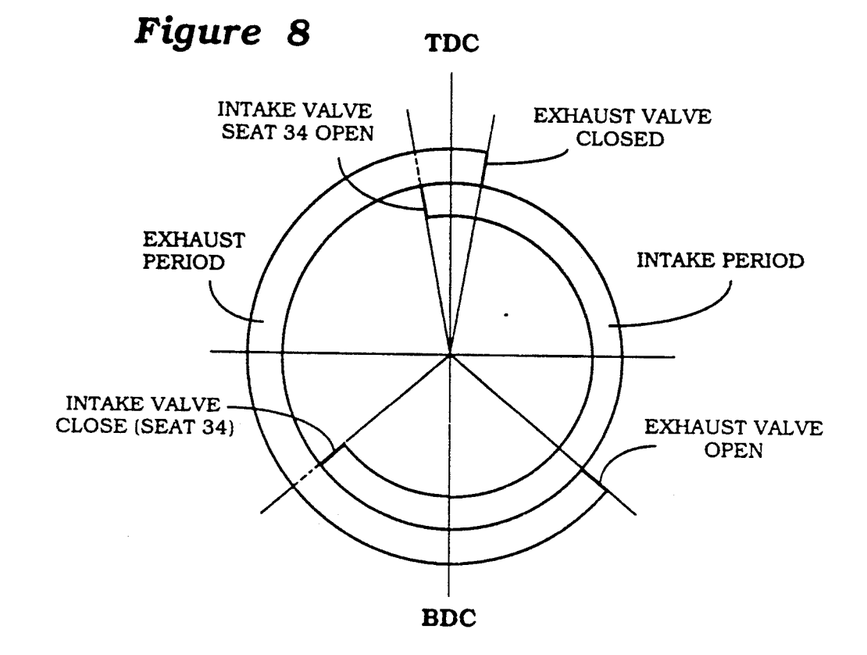
FIG. 8 is a timing diagram for the embodiment of Figure 5 and shows the timing of the opening of the intake valve related with the intake passage in which the fuel injection takes place in relation to exhaust port timing.
Figure 9:
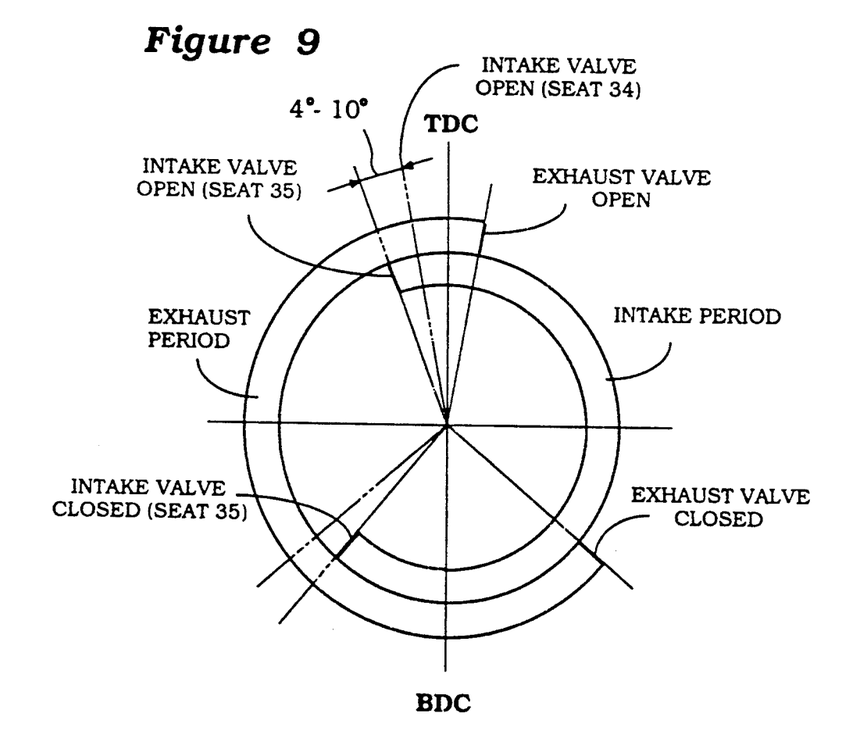
FIG. 9 is a timing diagram for this embodiment in part similar to FIG. 8 for the intake passage in which the EGR gases are introduced.

FIGS. 8 and 9 show the valve timing that is employed for the intake valves 36 associated with the valve seats 34 and 35, respectively and how the advance in opening and closing of the intake valve associated with the valve seat 35 tends to reduce the amount of charge drawn through the secondary induction passage 33 relative to the primary induction passage 32.

FIG. 8 shows the conventional timing of the intake valve 36 associated with the primary valve seat 34. FIG. 9 shows the timing associated with the intake valve 36 of the secondary valve seat 35 and how it is advanced relative to the timing of the intake valve that cooperates with the valve seat 34. This valve opens approximately four to ten degrees before the other intake valve and hence has more overlap with the exhaust valve timing. As a result of this, there will be less fresh air flow through the secondary intake passage 33 because initial opening of the intake valve 36 associated with the valve seat 35 will cause some exhaust gases to flow back from the combustion chamber into the secondary induction passage 33. This will further insure against weakening of the mixture and it should be understood that this valve timing may also be employed, if desired, with the other embodiments of the invention.

Figure 10:
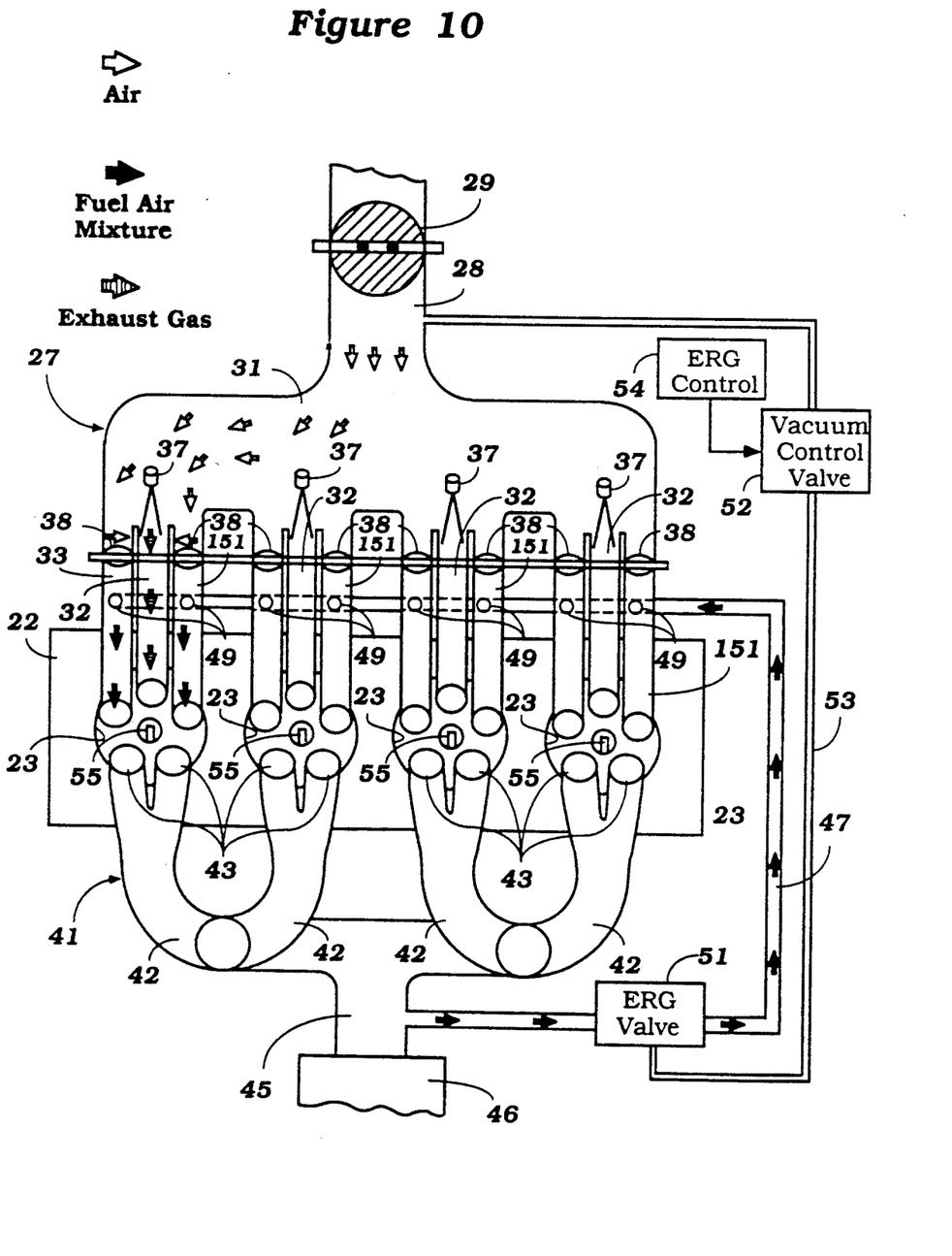
FIG. 10 is a partially schematic cross sectional view, in pare similar to FIGS. 1 and 5 and shows another embodiment of the invention.

FIG. 10 shows a further embodiment of the invention which is generally similar to the embodiment of FIG. 1 but in this embodiment there are provided five valves per cylinder (three intake and two exhaust). As a result, the induction system associated with each cylinder includes the primary induction passage 32 and secondary induction passage 33 but also includes a further secondary induction passage 151. In this embodiment, the primary induction passage 32 is disposed between the secondary induction passages 33 and 151 so that the stoichiometric fuel air mixture discharged by the fuel injector 37 will pass in proximity to the centrally positioned spark plug 55. In this embodiment, control valves 38 are provided on the control valve shaft 39 for both of the secondary induction passages 33 and 151. In all other regards this embodiment is the same as the embodiment of FIGS. 1 through 3 and it should be noted that there are exhaust gas recirculation ports associated with each of the secondary induction passages 33 and 151 for the reasons as aforenoted.

Figure 11:
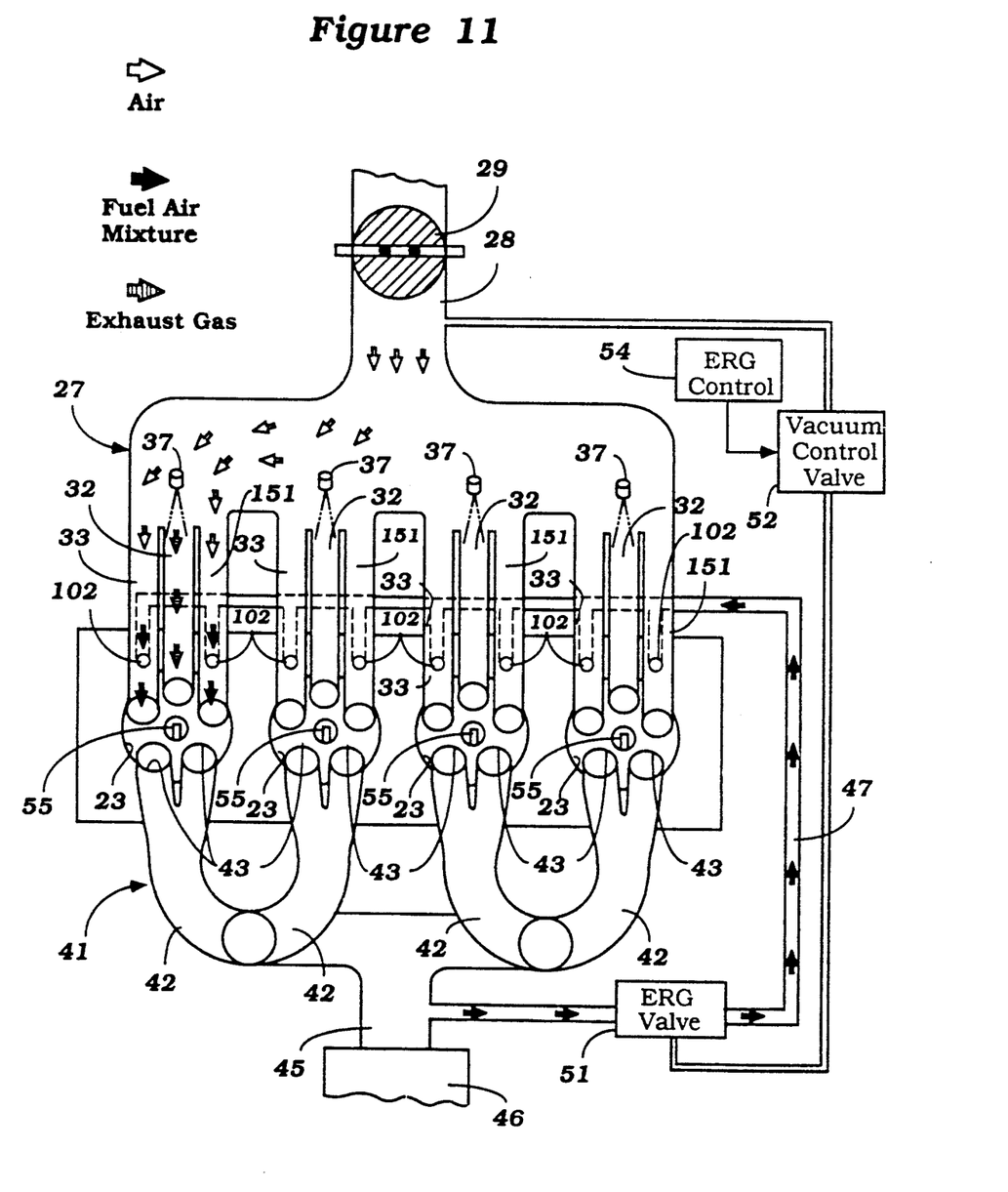
FIG. 11 is a partially schematic cross sectional view, in pare similar to FIGS. 1, 5 and 10 and shows yet another embodiment of the invention.

FIG. 11 shows a five valve embodiment similar to FIG. 10 but in this embodiment the control valves are eliminated, as with the embodiment of FIG. 5. Aside from this, this embodiment is the same as those previously described and, for that reason, further description of this embodiment is not believed to be necessary for those skilled in the art to understand how the invention operates.

In the embodiments of FIGS. 10 and 11 it should be noted that the fuel injectors 37 are positioned in the plenum chamber portion 31 of the intake manifolds 27 but have their spray directed to the primary induction passages 32. Under wide open running condition it is desirable to have some fuel also sprayed into the secondary induction passages 33 and 151 and this may be accomplished with a single fuel injector by the provision of a slideably supported rod like member (not shown) that is mounted in the intake manifold 27 in a position to pass into the center of the spray pattern from the injector 37. When this projection is extended, the spray from the nozzles 37 will be deflected partially from the center primary induction passage 32 to the side secondary induction passages 33 and 151 so as to provide more even mixture distribution. By doing this it is possible to achieve this mixture distribution with a single fuel injector and also without having the fuel spray to the secondary induction passages 33 and 151 when the engine is operating at low and mid-range conditions.

It should be readily apparent from the foregoing description that the described embodiments of the invention are very effective in providing good exhaust emission control and, at the same time, good fuel economy without any adverse running under any running condition. Of course, the foregoing description is that of preferred embodiments of the invention and various changes and modifications may be made without departing from the spirit and scope of the invention as defined by the appended claims.

We claim:

1. An induction system for an internal combustion engine having a combustion chamber, at least a pair of intake passages serving said combustion chamber for introducing an air charge thereto, each of said intake passages being configured to induce turbulence to the charge entering said combustion chamber from the respective intake passage, the intake passages being configured relative to each other for promoting turbulence to the charge within said chamber and for mixing of the charge introduced by each of said intake passages with that of the other to promote a homogeneous charge within the combustion chamber, at least one exhaust passage for discharging exhaust gases from said combustion chamber, means for introducing a stoichiometric fuel air charge into at least one of said intake passages under at least one running condition, and means for delivering exhaust gases from said exhaust passage into another of said intake passages under said one running condition.

2. An induction system for an internal combustion engine as set forth in claim 1 wherein the amount of exhaust gases introduced into the other intake passage during the one running condition is sufficient to preclude substantially any air induction into the combustion chamber from said other intake passage during the said one running condition.

3. An induction system for an internal combustion engine as set forth in claim 2 wherein the amount of exhaust gas recirculation comprises in the range of ten to twenty percent of the total intake charge.

4. An induction system for an internal combustion engine as set forth in claim 3 wherein the stoichiometric fuel air charge is delivered only to the one intake passage and the exhaust is introduced only to the other intake passage under the one running condition.

5. An induction system for an internal combustion engine as set forth in claim 4 further including control valve means in the other intake passage for controlling the flow there through, the exhaust gases being introduced to said other intake passage downstream of said control valve means.

6. An induction system for an internal combustion engine as set forth in claim 5 wherein the one running condition is low speed/low load.

7. An induction system for an internal combustion engine as set forth in claim 6 wherein the control valve means is closed during low speed/low load condition.

8. An induction system for an internal combustion engine as set forth in claim 1 wherein each of the intake passages terminate at a valve seat in the combustion chamber.

9. An induction system for an internal combustion engine as set forth in claim 8 wherein the exhaust gases are delivered to the other intake passage adjacent its valve seat.

10. An induction system for an internal combustion engine as set forth in claim 9 further including control valve means in the other intake passage for controlling the flow there through, the exhaust gases being introduced to said other intake passage downstream of said control valve means.

11. An induction system for an internal combustion engine as set forth in claim 10 wherein the one running condition is low speed/low load.

12. An induction system for an internal combustion engine as set forth in claim 11 wherein the control valve means is closed during low speed/low load condition.

13. An induction system for an internal combustion engine as set forth in claim 1 wherein the stoichiometric fuel air charge is delivered only to the one intake passage and the exhaust is introduced only to the other intake passage under the one running condition.

14. An induction system for an internal combustion engine as set forth in claim 13 further including control valve means in the other intake passage for controlling the flow therethrough, the exhaust gases being introduced to said other intake passage downstream of said control valve means.

15. An induction system for an internal combustion engine as set forth in claim 14 wherein the control valve means is closed during low speed/low load condition.

16. An induction system for an internal combustion engine as set forth in claim 1 wherein each of the intake passages terminates at a respective valve seat in the combustion chamber and wherein the means for introducing the stoichiometric fuel air charge delivers the charge only to the one intake passage and the exhaust gases are delivered only to the other intake passage during the running condition.

17. An induction system for an internal combustion engine as set forth in claim 16 wherein the intake passages are both opened and closed at the same timing.

18. An induction system for an internal combustion engine as set forth in claim 16 wherein the intake passages have their valve seats opened at different timing.

19. An induction system for an internal combustion engine as set forth in claim 18 wherein the timing of opening and closing of the valve seat associated with the other intake passage is advanced relative to the timing of the opening and closing of the valve seat of the intake passage for reducing the air flow through the other intake passage.

20. An induction system for an internal combustion engine as set forth in claim 19 wherein the one running condition is low speed/low load.

21. An induction system for an internal combustion engine as set forth in claim 1 wherein there are three intake passages.

22. An induction system for an internal combustion engine as set forth in claim 21 wherein the stoichiometric fuel air charge is delivered only to the one intake passage at the one running condition and wherein exhaust gases are delivered to the other intake passages during the one running condition.

23. An induction system for an internal combustion engine as see forth in claim 22 wherein each of the intake passages terminate at a valve seat in the combustion chamber.

24. An induction system for an internal combustion engine as set forth in claim 23 wherein the exhaust gases are delivered to the other intake passages adjacent their valve seats.

25. An induction system for an internal combustion engine as see forth in claim 24 further including control valve means in the other intake passages for controlling the flow therethrough, the exhaust gases being introduced to said other intake passages downstream of said control valve means.

26. An induction system for an internal combustion engine as set forth in claim 25 wherein the one running condition is low speed/low load.

27. An induction system for an internal combustion engine as set forth in claim 26 wherein the control valve means is closed during low speed/low load condition.

28. An induction system for an internal combustion engine as set forth in claim 1 wherein the means for introducing the stoichiometric fuel air charge comprises a fuel injector.

29. An induction system for an internal combustion engine as set forth in claim 28 wherein the fuel injector sprays fuel into the only the one intake passage during the one running condition and further including means for directing the spray from the fuel injector to the other intake passage at other running conditions.

30. An induction system for an internal combustion engine as set forth in 29 wherein the means for directing the spray comprises a rod-like member adapted to be brought into registry with the fuel spray when the fuel spray is to be redirected.

31. An induction system for an internal combustion engine as set forth in claim 30 wherein there are three intake passages and the fuel injector sprays directly into the center of the intake passages and the deflecting means deflects the fuel spray into the other intake passages.

32. A fuel injection system for an internal combustion engine having a combustion chamber, at least a pair of intake passages serving said combustion chamber for introducing an air charge thereto, a fuel injector for spraying fuel into one of said intake passages upstream of its inlet end, and deflector means adapted to be moved from a retracted portion out of said spray into a position in registry with the spray from said fuel injector for deflecting the spray from said fuel injector into the other intake passage.

33. A fuel induction system for an internal combustion engine as set forth in claim 32 wherein the means for deflecting the spray comprises a rod-like member adapted to be brought into registry with the fuel spray when the fuel spray is to be redirected.

34. An induction system for an internal combustion engine as set forth in claim 32 wherein there are three intake passages and the fuel injector sprays directly into the center of the intake passage and the deflecting means deflects the fuel spray into the remaining intake passages.

35. An induction system for an internal combustion engine having a combustion chamber, at least a pair of intake passages serving said combustion chamber for introducing an air charge thereto, at least one exhaust passage for discharging exhaust gases from said combustion chamber, means for introducing a stoichiometric fuel air charge into at least one of said intake passages under at least on running condition, and means for delivering exhaust gases from said exhaust passage into another of said intake passages under said one running condition in a volume sufficient to preclude substantially any air induction into the combustion chamber from said other intake passage during the said one running condition and to reduce pumping losses through said other intake passage.

36. An induction system for an internal combustion engine as set forth in claim 35 wherein the amount of exhaust gas recirculation comprises in the range of ten to twenty percent of the total intake charge.

37. An induction system for an internal combustion engine as set forth in claim 35 further including control valve means in the other intake passage for controlling the flow there through, the exhaust gases being introduced to said other intake passage downstream of said control valve means.

38. An induction system for an internal combustion engine as set forth in claim 37 wherein the one running condition is low speed/low load.

39. An induction system for an internal combustion engine as set forth in claim 38 wherein the control valve means is closed during low speed/low load condition.

40. An induction system for an internal combustion engine as set forth in claim 35 wherein each of the intake passages terminates at a respective valve seat in the combustion chamber and wherein the means for introducing the stoichiometric fuel air charge delivers the charge only to the one intake passage and the exhaust gases are delivered only to the other intake passage during the running condition.

41. An induction system for an internal combustion engine as set forth in claim 40 wherein the intake passages are both opened and closed at the same timing.

42. An induction system for an internal combustion engine having a combustion chamber, at least a pair of intake passages serving said combustion chamber for through respective valve seats for introducing an air charge thereto, valve means for controlling the flow through said valves seats, at least one exhaust passage for discharging exhaust gases from said combustion chamber, means for introducing a stoichiometric fuel air charge into at least one of said intake passages under at least on running condition, and means for delivering exhaust gases from said exhaust passage into another of said intake passages under said one running condition, the timing of opening and closing of the vales eat associated with the other intake passage being advanced relative to the timing of the opening and closing of the valve seat of the one intake passage for reducing the air flow through the other intake passage.

43. An induction system for an internal combustion engine as set forth in claim 42 wherein the one running condition is low speed/low load.

* * * * *